United States Patent
Honda et al.

(10) Patent No.: US 6,797,207 B2
(45) Date of Patent: Sep. 28, 2004

(54) PROCESS FOR PRODUCING ORGANIC THIN FILM

(75) Inventors: Eiji Honda, Yokohama (JP); Tomoki Yamaguchi, Nobeoka (JP)

(73) Assignees: Asahi Kasei EMD Corporation, Tokyo (JP); Asahi Kasei Electronics Co., Ltd., Tokyo (JP)

(*) Notice: Subject to any disclaimer, the term of this patent is extended or adjusted under 35 U.S.C. 154(b) by 202 days.

(21) Appl. No.: 09/951,630

(22) Filed: Sep. 14, 2001

(65) Prior Publication Data

US 2002/0004126 A1 Jan. 10, 2002

Related U.S. Application Data

(62) Division of application No. 09/210,622, filed on Dec. 14, 1998, now Pat. No. 6,342,292.

(30) Foreign Application Priority Data

Dec. 16, 1997 (JP) .............................................. 9-363290
Jan. 16, 1998 (JP) ........................................... 10-018347

(51) Int. Cl.⁷ .............................................. B29C 67/00
(52) U.S. Cl. ................................... 264/81; 264/331.14
(58) Field of Search ............................. 264/81, 331.11, 264/331.14

(56) References Cited

U.S. PATENT DOCUMENTS 4,370,291 A * 1/1983 Kazama et al. .......... 264/210.7
5,286,567 A * 2/1994 Kubota et al. .............. 428/422
5,492,587 A * 2/1996 Hong .......................... 156/246
5,766,529 A * 6/1998 Franke et al. ............... 264/143
6,342,292 B1 * 1/2002 Honda et al. ............... 428/220
6,423,167 B1 * 7/2002 Palmer et al. .............. 156/209

FOREIGN PATENT DOCUMENTS

| JP | 5683941 A | 7/1981 |
|---|---|---|
| JP | 58219023 A | 12/1983 |
| JP | 6035733 A | 2/1985 |
| JP | 6327707 B2 | 5/1985 |
| JP | 61209449 A | 9/1986 |
| JP | 6239859 A | 2/1987 |
| JP | 1100549 A | 4/1989 |
| JP | 1166045 A | 6/1989 |
| JP | 264 A | 1/1990 |
| JP | 2230245 A | 9/1990 |
| JP | 339963 A | 2/1991 |
| JP | 667410 A | 3/1994 |
| JP | 6317894 A | 11/1994 |
| JP | 768576 A | 3/1995 |
| JP | 885728 A | 4/1996 |

OTHER PUBLICATIONS

JP 06222551, Aug. 12, 1994, Derwent Abstract.*

* cited by examiner

*Primary Examiner*—Mark Eashoo
(74) *Attorney, Agent, or Firm*—Birch, Stewart, Kolasch & Birch, LLP

(57) ABSTRACT

A wrinkle-free organic film having a high light transmittance and a uniform film thickness is obtained by forming an organic thin film on the surface of a substrate having a contact angle of the surface to water of 90° or higher, followed by peeling the film therefrom.

9 Claims, No Drawings

PROCESS FOR PRODUCING ORGANIC THIN FILM

This application is a divisional of application Ser. No. 09/210,622, now U.S. Pat. No. 6,342,292 filed on Dec. 14, 1998, the entire contents of which are hereby incorporated by reference and for which priority is claimed under 35 U.S.C. § 120; and this application claims priority under 35 U.S.C. § 119 of application Ser. No. 9-363,290 and application Ser. No. 10-018,347, filed in Japan on Dec. 16, 1997 and Jan. 16, 1998, respectively.

BACKGROUND OF THE INVENTION

1) Field of the Invention

The present invention relates to an organic thin film obtained by forming an organic thin film on a substrate followed by peeling the film therefrom, and a process for producing an organic thin film, which comprises forming an organic thin film on a substrate, followed by peeling the film therefrom, where the peeling can be made easily.

2) Description of the Related Art

One example of organic thin film obtained by forming an organic thin film on a substrate, followed by peeling the film therefrom is a pellicle, which can be used by fixing it to a photo mask or a reticle used in the photolithographic process in the production of semiconductor integrated circuits, and the photo mask or reticle will be hereinafter referred to merely as "mask".

The pellicle is a dust cover for photomasks or reticles for use in production of large-scale integration circuits and substrates for liquid crystals.

The pellicle is provided above the mask at a specific distance from the mask. Thus, even if fine foreign matters, etc. are attached to the pellicle in the photolithographic process, none of their images is projected on a photoresist-coated semiconductor wafer. That is, by protecting a mask by a pellicle, short circuits, disconnection, etc. of semiconductor integrated circuits can be protected, thereby improving production yields of photolithographic process, and furthermore reducing number of mask cleaning operations, which leads to prolonged mask life. It is the pellicle that can attain such effects.

Light source for irradiation in the photolithographic process includes an ultrahigh pressure mercury lamp, and its g line ($\lambda$=436 nm), h line ($\lambda$=405 nm) and i line ($\lambda$=365 nm) are used as emission lines for the irradiation.

With recent technological progress in the semiconductor industry, integrated circuits of higher density and higher degree of integration are now available and projection patterns with smaller line width and interline distance on a wafer are also now available. Consequently, light sources for irradiation with shorter wavelength are utilized now. For example, far ultraviolet rays (Deep UV) by an excimer laser of krypton fluoride (KrF), argon fluoride (ArF), etc. can be used. To meet the light sources of shorter wavelength, light-stable pellicles transparent to such higher energy radiation beams are now keenly desired.

To meet such requirements, pellicles composed of fluorine-based materials or silicon-based materials have been proposed. The materials include, for example, fluorine-based materials such as tetrafluoroethylene-hexafluoropropylene-vinylidene fluoride copolymers (JP-B63-27707), fluorine-based polymers having a perfluoroalkyl ether ring structure, i.e. CYTOP (trademark of a product commercially available from Asahi Glass Co., Ltd., Japan), Teflon AF (trademark of a product commercially available from E.I. du Pont de Nemours & Co., Inc., USA), etc., and polymeric organosilicone compounds such as polytrimethylvinylsilane, etc. (JP-A-2-230245), etc.

A reflection-preventing single, double or multiple layer can be provided on one side or both sides of a pellicle.

Materials proposed for a reflection-preventing layer(s) as an outermost layer(s) include, for example, tetrafluoroethylene-vinylidene fluoridehexafluoropropylene polymer (JP-A-61-209449), polyfluoroacrylate (JP-A-1-100549), fluoropolymer having a ring structure on the principal chain, i.e. Teflon AF (trademark of a product commercially available from E.I. du Pont de Nemours & Co., Inc., USA, JP-A-3-39963), CYTOP (trademark of a product commercially available from Asahi Glass Co., Ltd., Japan), etc.

Most of the materials for the outermost reflection-preventing layer are fluorine-containing polymers or inorganic fluoride materials such as calcium fluoride, magnesium fluoride, etc. Most of materials for a transparent thin film layer (central layer) are cellulose derivatives such as nitrocellulose, cellulose acetate propionate, carbonated acetyl cellulose, etc.

Such a pellicle has been so far produced by forming a film from such pellicle materials as mentioned above on a smooth substrate of glass, quartz, Si wafer or the like, followed by peeling it therefrom. A pellicle composed of fluorine-based materials or silicon-based materials, when formed on the substrate, has a high adhesiveness to the substrate, so that the film is hard to peel from the substrate, thereby leading the film to breaking or wrinkling.

When a pellicle film is to be formed on a substrate by forming the outermost reflection-preventing layer and so on successively in this order, the outermost reflection-preventing layer is hard to peel from the substrate, because it is composed of fluorine-based materials and consequently has a high adhesiveness to the substrate.

So far proposed methods for peeling the film from the substrate include, for example, a method for peeling by dipping into water (JP-A-58-219023; JP-A-60-35733; JP-A-2-64, etc.), a method for peeling by dipping in a chemical solution and then in water (JP-A-56-83941), a method for peeling from a substrate in a wet state (JP-A-62-39859), a method for peeling in an atmosphere at a relative humidity of 60% or higher (JP-A-6-67410), a method for peeling upon cooling to 5° C. or lower (JP-A-1-166045), etc.

However, peeling by the above-mentioned methods have such problems as deterioration of light transmissivity, uneven film thickness, etc. Particularly, dipping into water or chemical solution has such problems as contamination of pellicle films and deterioration of light transmittance. Peeling in a wet state or in an atmosphere at a relative humidity of 60% or higher has such problems as unevenness of film thickness (color unevenness and difficult process control besides the problem of deteriorated light transmittance due to the fouling of pellicle film. Furthermore, peeling upon cooling to 5° C. or lower has such problems as a failure to obtain desired effects, depending on pellicle materials, process complication, etc.

Substrate that has been once peeled off the pellicle film has such a problem as contamination of substrate surface, and thus the film-peeled substrate must be cleaned or repolished before its reuse.

SUMMARY OF THE INVENTION

An object of the present invention is to provide a wrinkle-free organic thin film having a high light transmittance and a uniform film thickness and also to provide a process for producing an organic thin film readily peelable from the substrate, the substrate being repeatedly reusable as a recycle substrate, as distinguished over the above-mentioned prior art.

As a result of extensive studies to solve the above-mentioned prior art problems, the present inventors have found that a wrinkle-free organic thin film having a high light transmittance and a uniform film thickness can be obtained by forming an organic thin film on the surface of a substrate having a contact angle of the surface to water of 90° or higher, or particularly an organic thin film comprising a fluorine-based material or a silicon-based material on a substrate having a specific silicon compound on the surface, thereby making the formed organic thin film readily peelable from the substrate, and the substrate that has been peeled off the film repeatedly reusable as a recycle substrate, and have established the present invention.

A first aspect of the present invention is to provide an organic thin film obtained by forming an organic thin film on the surface of a substrate having a contact angle of the surface to water of 90° or higher, followed by peeling the film therefrom.

A second aspect of the present invention is to provide an organic thin film obtained by forming an organic thin film comprising a fluorine-based material or a silicon-based material on the surface of a substrate having a layer comprising a silicon compound having a perfluoroalkyl group formed on the surface, followed by peeling the film therefrom.

A third aspect of the invention is to provide an organic thin film according to the first or second aspect of the present invention, wherein the organic thin film is in a single layer.

A fourth aspect of the present invention is to provide an organic thin film according to any one of the first to third aspects of the present invention, wherein the organic thin film is a pellicle.

A fifth aspect of the present invention is to provide an organic thin film according to the first, second or fourth aspect of the present invention, wherein the organic thin film is a pellicle comprising a reflection-preventing layer composed of a fluorine-based material and a transparent thin film layer.

A sixth aspect of the present invention is to provide an organic thin film according to any one of the second to fourth aspects of the present invention, wherein the layer comprising a silicon compound having a perfluoroalkyl group is formed by vapor deposition.

A seventh aspect of the present invention is to provide an organic thin film according to any one of the second to fourth aspects of the present invention, wherein the silicon compound having a perfluoroalkyl group is a compound represented by the following formula (1):

$$CF_3(CF_2)_nCH_2CH_2Si(OMe)_3 \quad (1)$$

where n is an integer of 5 to 7 and Me is a methyl group.

An eighth aspect of the present invention is to provide a process for producing an organic thin film, which comprises forming an organic thin film on the surface of a substrate having a contact angle of the surface to water of 90° or higher, followed by peeling the film therefrom.

A ninth aspect of the present invention is to provide a process for producing an organic thin film, which comprises forming an organic thin film comprising a fluorine-based material or a silicon-based material on the surface of a substrate having a layer comprising a silicon compound having a perfluoroalkyl group formed on the surface, followed by peeling the film therefrom.

A tenth aspect of the present invention is to provide a process for producing an organic thin film according to the eighth or ninth aspect of the present invention, wherein the organic thin film is in a single layer.

An eleventh aspect of the present invention is to provide a process for producing an organic thin film according to any one of the eighth to tenth aspects of the present invention, wherein the organic thin film is a pellicle.

A twelfth aspect of the present invention is to provide a process for producing an organic thin film according to the eighth, ninth or eleventh aspect of the present invention, wherein the organic thin film is a pellicle comprising a reflection-preventing layer composed of a fluorine-based material and a transparent thin film layer.

A thirteenth aspect of the present invention is to provide a process for producing an organic thin film according to any one of the ninth to eleventh aspects of the present invention, wherein the layer comprising a silicon compound having a perfluoroalkyl group is formed by vapor deposition.

A fourteenth aspect of the present invention is to provide a process for producing an organic thin film according to any one of the ninth to eleventh aspects of the present invention, wherein the silicon compound having a perfluoroalkyl group is a compound represented by the following formula (1):

$$CF_3(CF_2)_nCH_2CH_2Si(OMe)_3 \quad (1)$$

where n is an integer of 5 to 7 and Me is a methyl group.

The present invention provides a wrinkle-free organic thin film having a high light transmittance and a uniform film thickness and a process for producing an organic thin film readily peelable from a substrate, the substrate being repeatedly reusable as a recycle substrate. Particularly by forming a layer comprising a silicon compound having a perfluoroalkyl group on the substrate by vapor deposition an organic thin film having a good surface smoothness, and a very high light transmittance and particularly readily peelable from the substrate can be obtained.

DETAILED DESCRIPTION OF THE PREFERRED EMBODIMENTS

Substrate for use in the formation of the present organic thin film includes those composed of glass such as soda lime, etc., quartz, Si wafer, etc. The substrate must have a sufficiently smooth surface.

The substrate for use in the present invention is a substrate so treated as to give a contact angle of the substrate surface to water of 90° or higher or a substrate originally having a contact angle to water of 90° or higher.

The contact angle of the substrate surface to water means an angle formed between the substrate surface and a tangential line drawn to the top free side of a water droplet on the substrate surface at the contact point of the substrate surface and the down contact side of the water droplet on the substrate surface, the angle covering the entire periphery of water droplet. The water droplet is of pure water.

Any treating procedure can be used to make the contact angle of the substrate surface to water 90° or higher, including, for example, formation of a layer comprising a silicon compound having a perfluoroalkyl group on the surface of a substrate. Such formation of a silicon compound having a perfluoroalkyl group on the substrate can be made by any procedure, but preferably by spin coating or vapor deposition, more preferably by vapor deposition.

Vapor deposition means deposition of vapors of a silicon compound having a perfluoroalkyl group onto a substrate.

Vapor deposition of a silicon compound having a perfluoroalkyl group onto a substrate can be carried out under an atmospheric, subatmospheric or superatmospheric pressure. A silicon compound having a perfluoroalkyl group and a substrate are placed into a container, where the substrate is formed with vapors of the silicon compound having a perfluoroalkyl group preferably under an atmospheric or subatmospheric pressure at a forming temperature of preferably 5 to 200° C., more preferably 20° to 130° C. The container is preferably tightly sealed, but may have a ventilation port to the outside. Forming time is preferably one minute to one week, more preferably one hour to 3 days.

Substrate having a layer comprising a silicon compound having a perfluoroalkyl group formed on the surface is used as a substrate for forming an organic thin film thereon.

Silicon compound having a perfluoroalkyl group includes, those represented by the following formulae (2), (3), (4) and (5):

$$CF_3(CF_2)_7CH_2CH_2Si(OMe)_3 \quad (2)$$

$$CF_3(CF_2)_5CH_2CH_2Si(Ome)_3 \quad (3)$$

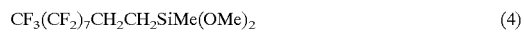

$$CF_3(CF_2)_7CH_2CH_2SiMe(OMe)_2 \quad (4)$$

$$CF_3(CF_2)_5CH_2CH_2SiMe(OMe)_2 \quad (5)$$

where Me is a methyl group; silazanes having a perfluoroalkyl group; and their oligomers, etc.

Among these compounds, the compound represented by the foregoing formula (2) (i.e. 10,10,10,9,9,8,8,7,7,6,6,5,5,4,4,3,3-heptadecafluoro-decyltrimethoxysilane) is particularly preferable.

An organic thin film is formed on the substrate having a layer of silicon compound having a perfluoro-alkyl group formed thereon by vapor deposition.

Thickness of the organic thin film so formed is 50 μm or less, preferably 10 μm or less.

The present organic thin film can be formed by any procedure, but spin coating is preferable because of distinguished precision of film thickness and surface characteristics. Spin coating depends on many factors such as solution viscosity; solvent evaporation rate, spin coater surrounding temperature and humidity, spin revolutions per minute, spin time, etc., and thus the factors must be properly selected.

Materials for the organic thin film are the above-mentioned fluorine-based materials and silicon-based materials such a tetrafluoroethylene-hexafluoropropylene-vinylidene fluoride copolymer, CYTOP, Teflon AF, polytrimethylvinylsilane, polytriethylvinylsilane, polyethyldimethylvinylsilane, etc. These materials can be used alone or in mixture of at least two thereof.

When the organic thin film is in the form of pellicle, these materials can be irradiated with light, for example, radiations such as γ-rays, electron beams, α-rays, etc., or far ultraviolet rays or the like to improve the solution filtrability, electric controllability, adhesiveness to pellicle support frame, etc.

Solvent for the fluorine-based materials includes, for example, perfluoroalkane, perfluorobenzene, perfluoro (2-butyltetrahydrofuran), trichlorotrifluoro-ethane, perfluorotripropylamine, perfluorotributylamine, etc. and mixtures thereof.

Solvent for the silicon-based materials includes, for example, benzene, toluene, xylene, etc. Boiling point of these solvents is preferably 70° C. or higher, more preferably 100° C. or higher.

Solution of the materials for the organic thin film must be subjected to spin coating after filtration to remove foreign matters, etc. The thickness of the resulting organic thin film can be properly selected by changing the solution viscosity and revolutions per minute of the substrate. The solvent contained in the organic thin film formed on the substrate can be evaporated off by a hot plate, an oven etc.

The organic thin film formed on the substrate is then bonded to a double faced tape-pasted support frame of metal, plastic, etc. at room temperature in air. Then, the organic thin film can be obtained by peeling the support frame from the substrate. Since the substrate has a contact angle of the surface to water of 90° or higher obtained by vapor deposition of the silicon compound having a perfluoroalkyl group on the surface of the substrate, the wrinkle-free organic thin film having a high light transmittance and a uniform thickness can be peeled from the substrate.

Furthermore, the substrate that has been peeled off the organic thin film can be repeatedly reused as a recycle substrate directly without cleaning for further formation of organic thin films, followed by peeling.

When the organic thin film is in the form of a pellicle, the pellicle can be bonded to the support frame, by an ultraviolet curing type adhesive, a thermosetting type adhesive or the like or by melt bonding or by a thick polymer solution as an adhesive.

In case of a pellicle having a single reflection-preventing layer on both sides, a reflection-preventing layer is at first formed on the substrate and, after thorough solvent evaporation from the reflection-preventing layer by drying, a transparent thin film layer (central layer) is then formed on the reflection-preventing layer. After thorough solvent evaporation from the transparent thin film layer by drying, another reflection-preventing layer is formed thereon. The triple layer film thus formed on the substrate is bonded to a double faced tape-pasted support frame of metal, plastic, etc. By peeling the support frame from the substrate, a pellicle triple layer film can be easily obtained thereby, because the silicon compound having a perfluoroalkyl group has been vapor deposited on the substrate surface in advance.

A pellicle having a double reflection-preventing layer on both sides can be likewise obtained by successively forming a low refractive index, reflection-preventing layer, a high refractive index, reflection-preventing layer, a transparent thin film layer (central layer), a high refractive index, reflection-preventing layer and a low refractive index, reflection-preventing layer on a substrate, bonding a support frame thereto, followed by peeling from the substrate. The five-layered film as bonded to the support frame can be easily obtained.

Materials for the transparent thin film layer (central layer) include, for example, cellulose derivatives such as nitrocellulose, cellulose acetate, cellulose acetate butyrate, cellulose acetate propionate, ethyl cellulose, carbonated acetyl cellulose, etc. The cellulose derivatives can be used alone, but nitro-cellulose has a distinguished film strength and a form retainability at a high humidity but has a poor light stability, as compared with other cellulose derivatives. Cellulose acetate, cellulose acetate propionate and cellulose acetate butyrate have a distinguished light stability, but have a poor film strength and a poor form retainability at a high humidity. Thus, it is preferable to use a mixture of nitrocellulose and at least one of other cellulose derivatives.

A mixing proportion of nitrocellulose to at least one of other nitrocellulose depends on the desired film strength, form retainability at a high humidity and light stability, but the nitrocellulose content of the mixture is preferably 10 to 50% by weight, more preferably 20 to 40% by weight. It is preferable to use cellulose derivatives having a higher molecular weight, because of a better form retainability of the thin film. That is, the molecular weight is 30,000 or more, preferably 50,000 or more in terms of number average molecular weight. Among the cellulose derivatives, nitrocellulose is commercially available from Asahi Chemical Industry Co., Ltd., Japan, and cellulose acetate, cellulose acetate butyrate and cellulose acetate propionate are commercially available from Eastman-Kodak Co., USA.

Solvent for the cellulose derivatives includes, for example, 2-butanone, methyl isobutyl ketone, cyclohexanone, butyl acetate, isobutyl acetate, ethyl lactate, cellosolve acetate, propyleneglycol monomethyl ether acetate, etc. and a mixture thereof. Solutions of cellulose derivatives are subjected to spin coating after filtration to remove foreign matters therefrom. Thickness of the transparent thin film (central layer) can be properly selected by changing the solution viscosity and revolutions per minute of the substrate. The solvent contained in the thin film formed on the substrate can be evaporated off by a hot plate, an oven, etc.

The reflection-preventing layer is in a single or double or multiple layer structure. In case of a single layer reflection prevention [the number of layers in a pellicle will be 3 (triple layer) when the reflection-preventing layer is formed on both sides of the transparent thin film layer], the reflection-preventing effect will be a maximum when the relation between the refractive index $n_1$ of the reflection-preventing layer and the refractive index $n_c$ of the transparent thin film (central layer) is $n_1=(n_c)^{1/2}$, and a larger reflection-preventing effect can be obtained by selecting reflection-preventing materials having a refractive index $n_1$ nearer to $(n_c)^{1/2}$. Let the reflection-to-prevent wavelength be $\lambda$, thickness d of the reflection-preventing layer must be selected to satisfy a relation of $n_1 \cdot d = \lambda/4$.

In case of a double layer reflection prevention (the number of layers in a pellicle will be 5 when the double reflection-preventing layer is formed on both sides of the transparent thin film layer as in the same manner as above), the layer in contact with the transparent thin film layer will be a high refractive index, reflection-preventing layer and the outermost layer will be a low refractive index, reflection-preventing layer. Let the refractive indices and thicknesses of the outermost reflection-preventing layer and the reflection-preventing layer in contact with the transparent thin film layer be $n_1$ and $d_1$, and $n_2$ and $d_2$, respectively, the reflection-preventing effect will be a maximum, when $n_2/n_1=(n_c)^{1/2}$, and a larger reflection-preventing effect can be obtained by selecting reflection-preventing layer materials having $n_2/n_1$ nearer to $(n_c)^{1/2}$. Let the reflection-to-prevent wavelength be $\lambda$, thicknesses $d_1$ and $d_2$ of the reflection-preventing layers must be selected to satisfy a relation of $n_1 \cdot d_1 = n_2 \cdot d_2 = \lambda/4$. For the central layer, cellulose derivatives, polyvinylbutyral, polyvinylpropional, etc. can be used, where their refractive indice $n_c$ are about 1.5, and thus $(n_c)^{1/2}$ will be about 1.22. That is, in case of the double layer reflection prevention, a larger reflection-preventing effect can be obtained preferably, when materials for the double reflection-preventing layer are selected to have a ratio of their refractive indice $n_2/n_1$ nearer to 1.22.

Materials for the low refractive index, reflection-preventing layer for use as the outermost layer include, for example, fluorine-based materials such as tetrafluoroethylene-vinylidene fluoride-hexafluoropropylene polymer, polyfluoroacrylate, Teflon AF (trademark of fluorine-based polymer having a cyclic structure on the principal chain, commercially available from E.I. du Pont de Nemours & Co., USA), CYTOP (trademark of a product commercially available from Asahi Glass Co., Ltd., Japan), etc. Preferable polyfluoroacrylate is FC-722 (trademark of a product commercially available from Sumitomo 3M Co., Ltd., Japan). In case of Teflon AF, [filterability] filterability, electric controllability and adhesiveness between the pellicle film and the support frame can be improved by irradiation of light such as radiations, e.g. γ-rays, electron beams, α-rays, etc., or far ultraviolet rays or like.

The fluorine-based materials for the reflection-preventing layer can be used alone or in mixture of other polymers. The fluorine-based polymer is dissolved into a fluorine-based solvent such as perfluorobenzene, perfluoro (2-butyltetrahydrofuran), trichlorotrifluoroethane, perfluorotributylamine, etc., but to obtain a smooth film surface free from color unevenness a high boiling point solvent is preferable. The boiling point is preferably 130° C. or higher, more preferably 160° C. or higher.

The fluorine-based polymer solution is subjected to spin coating after filtration to remove foreign matters therefrom in advance. Thickness of low refractive index, reflection-preventing layer for use as the outermost layer can be properly selected by changing the solution viscosity and revolutions per minute of the substrate. The solvent contained in the thin film formed on the substrate can be evaporated off by air drying or by a hot plate, an oven, etc.

In case of the double layer reflection-preventing pellicle, materials for the high refractive index, reflection-preventing layer in contact with the transparent thin film layer include, for example, polyvinylnaphthalene, polystyrene, polyether sulfone, etc. The pellicle with the reflection-preventing layers can be bonded to a support frame by an adhesive such as an ultraviolet-curing type adhesive or a thermosetting type adhesive. It is preferable to use an ultraviolet-curing type adhesive because of process simplicity and less damage to the pellicle film.

The present invention will be described in detail below, referring to Examples and Comparative

EXAMPLE 1

Example 1

An open top, polyethylene container, 5 cm in diameter, containing 20 ml of 10,10,10,9,9,8,8,7,7,6,6,5,5,4,4,3,3-heptadecafluoro-decyltrimethoxysilane and a polished silicon wafer were placed into a 30 cm-square metallic vessel, followed by tight sealing. The metallic vessel and its inside were heated to 105° C., left for standing in that state for 36 hours, and cooled to room temperature, and the treated silicon wafer was taken out of the metallic vessel. The treated silicon wafer had a contact angle of the surface to water of 110°, whereas the untreated polished wafer had a contact angle of 51°.

Then, CYTOP, S grade (trademark of a product commercially available from Asahi Glass Co., Ltd., Japan) was dissolved into perfluorotributylamine to make a 5.0 wt. % CYTOP solution.

Then, the treated silicon wafer was set to a spin coater, and the CYTOP solution was filtered through a membrane filter having a pore size of 0.2 μm and the filtrate was subjected to spin coating, followed by drying on a hot plate, whereby an organic thin film having a thickness of 0.84 μm was formed.

Then, a double faced tape-pasted metallic support frame was bonded to the organic thin film formed on the silicon wafer and peeled from the silicon wafer at 23° C. and a relative humidity of 50%, whereby the organic thin film could be easily peeled from the silicon wafer.

The resulting organic thin film was free from wrinkles and also from any color unevenness or transferred matters from the substrate, and was thus found satisfactory. The light transmittance at the wavelength of about 248 nm was as high as 99.9%, and the film thickness was uniform and satisfactory.

The silicon wafer surface that was peeled off the organic thin film, which will be hereinafter referred to as "recycle silicon wafer", had no traces of peeling and had the same contact angle of the surface to water of 110° C. as that before the organic thin film formation.

A second organic thin film was formed on the recycle silicon wafer by spin coating in the same manner as before, likewise followed by bonding a double faced tape-pasted metallic support frame to the second organic thin film formed on the recycle silicon wafer and peeling of the support frame from the recycle silicon wafer at 23° C. and a relative humidity of 50%, whereby the second organic thin film could be easily peeled therefrom.

The resulting second organic thin film was free from wrinkles and also from any color unevenness or transferred matters from the substrate and was thus found satisfactory. The light transmittance at the wavelength of about 248 nm was also as high as 99.9%, and the film thickness was also uniform and satisfactory.

The recycle silicon wafer surface that was peeled off the second organic thin film also had no traces of peeling and had a contact angle of the surface to water of 110° C.

Further organic thin films were repeatedly formed on the same recycle silicon wafer that was peeled off the organic thin film just before in the same manner as above, followed by peeling the just formed organic thin film, and it was found that 30 recyclic uses of the same recycle silicon wafer could be made.

The resulting organic thin films were all free from any wrinkles, color unevenness, traces of peeling or transferred matters from the substrate and were thus found satisfactory. The light transmittance at the wavelength of about 248 nm was also as high as or higher than 99.8% and the film thickness was also satisfactory.

Even after the 30 recyclic uses, the silicon wafer surface was free from traces of peeling and also had the same contact angle of the surface to water of 110° as before the formation of the organic thin films.

Example 2

As in Example 1, 10,10,10,9,9,8,8,7,7,6,6,5,5,4,4,3,3-heptadecafluoro-decyltrimethoxysilane and a polished silicon wafer were placed into a metallic vessel, followed by light sealing. The metallic vessel and its inside were heated to 30° C., left for standing in that state for 24 hours, and cooled to room temperature, and the treated silicon wafer was taken out of the metallic vessel. The treated silicon wafer had a contact angle of the surface to water of 103°, whereas the untreated polished silicon wafer had a contact angle of 51°.

Then, Teflon AF 1600 (trademark of a product commercially available from E.I. du Pont de Nemours & Co., Inc., USA) was irradiated with γ-rays in air at an irradiation dose of 50 kGy (Gy: dose unit), which will be hereinafter referred to as "γAF 1600". The γAF 1600 was dissolved into perfluorotributylamine to make a 5.0 wt. % γAF 1600 solution.

Then, the treated silicon wafer was set to a spin coater, and the γAf 1600 solution was filtered through a membrane filter having a pore size of 0.2 μm, and the filtrate was subjected to spin coating, followed by drying on a hot plate, whereby an organic thin film having a thickness of 0.84 μm was formed.

As in Example 1, a double faced tape-pasted metallic support frame was bonded to the organic thin film formed on the silicon wafer and removed together with the organic thin film from the silicon wafer at 23° C. and a relative humidity of 50%, whereby the organic thin film could be easily peeled from the silicon wafer.

The resulting organic thin film was free from any wrinkles, color unevenness, traces of peeling, and transferred matters from the substrate and was thus found satisfactory. The light transmittance at the wavelength of about 248 nm was as high as 99.5% and the film thickness was uniform and satisfactory.

The silicon wafer surface that was peeled off the organic thin film had no traces of peeling and a contact angle of the surface to water of 103°, and the silicon wafer was repeatedly used as recycle silicon wafer.

Then, further organic thin films were repeatedly formed on the same recycle silicon wafer that was peeled off the organic thin film just before in the same manner as above, followed by peeling the just formed organic thin film, and it was found that 10 recyclic uses of the same recycle silicon wafer could be made.

The resulting organic thin films were all free from any wrinkles, color unevenness, traces of peeling and transferred matters from the substrate and were thus found satisfactory. The light transmittance at the wavelength of 248 nm was as high as 99.5% and the film thickness was uniform and satisfactory.

Even after the 10 recyclic uses, the silicon wafer surface was free from traces of peeling and also had the same contact angle of the surface to water of 103° as before the formation of the organic thin films.

Example 3

As in Example 2, 10,10,10,9,9,8,8,7,7,6,6,5,5,4,4,3,3-heptadecafluoro-decyltrimethoxysilane and a polished silicon wafer were placed into a metallic vessel, followed by tight sealing. The metallic vessel and its inside were heated to 30° C., left for standing in that state for 24 hours, and cooled to room temperature, and the treated silicon wafer was taken out of the metallic vessel. The treated silicon wafer had a contact angle of the surface to water of 103°, whereas the untreated polished silicon wafer had a contact angle of 51°.

As in Example 2, an organic thin film was formed on the treated silicon wafer, using the γAf 1600 solution. A double faced tape-pasted metallic support frame was bonded to the organic thin film formed on the silicon wafer and the organic thin film could be easily peeled from the silicon wafer at 23° C. and a relative humidity of 50%.

The resulting organic thin film was free from any wrinkles, color unevenness, and transferred matters from the substrate and was thus found satisfactory. The light transmittance at the wavelength of 248 nm was as high as 99.6% and the film thickness was uniform and satisfactory.

The silicon wafer surface that was peeled off the organic thin film had no traces of peeling and had a contact angle of the surface to water of 103°, and the silicon wafer was repeatedly used as a recycle silicon wafer.

Further organic thin films were repeatedly formed on the same recycle silicon wafer that was peeled off the organic thin film just before in the same manner as above, followed by peeling the just formed organic thin film, and it was found that 10 recyclic uses of the same recycle silicon wafer could be made.

The resulting organic thin films were all free from any wrinkles, color unevenness, traces of peeling and transferred matters from the substrate and were thus satisfactory. The light transmittance at the wavelength of 248 nm was a high as 99.6% and the film thickness was uniform and satisfactory.

Even after the 10 recyclic uses, the silicon wafer surface was free from traces of peeling and also had the same contact angle of the surface to water of 103° as before the formation of the organic thin films.

Example 4

10,10,10,9,9,8,8,7,7,6,6,5,5,4,4,3,3-heptadecafluorodecyltrimethoxysilane and a polished silicon wafer were placed into a metallic vessel, followed by tight sealing under inside vessel pressure of 660 mm Hg (−100 mm Hg). The metallic vessel and the inside were heated to 30° C., left for standing in that state for 24 hours, and cooled to room temperature, and the treated silicon wafer was taken out of the metallic vessel. The treated silicon wafer had a contact angle of the surface to water of 104°, whereas the untreated polished silicon wafer had a contact angle of 51°.

As in Example 2, an organic thin film was formed on the treated silicon wafer by spin coating, using the γAF 1600 solution. A double faced tape-pasted metallic support frame was bonded to the organic thin film formed on the silicon wafer and peeled from the silicon wafer at 23° C. and a relative humidity of 50%, whereby the organic thin film could be easily peeled from the silicon wafer.

The resulting organic thin film was free from any wrinkles, color unevenness, traces of peeling and transferred matters from the substrate and was thus found satisfactory. The light transmittance at the wavelength of about 248 nm was as high as 99.6% and the film thickness was uniform and satisfactory.

The silicon wafer surface that was peeled off the organic thin film had no traces of peeling and had a contact angle of the surface to water of 104°. The silicon water was repeatedly used as a recycle silicon wafer.

Further organic thin films were repeatedly formed on the same recycle silicon wafer that was peeled off the organic thin film just before in the same manner as above, followed by peeling the just formed organic thin film, and it was found that 10 recyclic uses the same recycle silicon wafer could be made.

The resulting organic thin films were all free from any wrinkles, color unevenness, traces of peeling and transferred matters from the substrate and were thus found satisfactory. The light transmittance at the wavelength of 248 nm was as high as or higher than 99.6% and the film thickness was uniform and satisfactory.

Even after the 10 recyclic uses, the silicon wafer surface had no traces of peeling and had the same contact angle of the surface to water of 104° as before the formation of the organic thin films.

Example 5

A compound represented by the following formation (3):

$$CF_3(CF_2)_5CH_2CH_2Si(OMe)_3 \qquad (3)$$

where Me is a methyl group, and a polished silicon wafer were placed into a metallic container, followed by tight sealing. The metallic container and its inside were heated to 105° C., left for standing in that state for 36 hours, and cooled to room temperature and the treated silicon wafer was taken out of the metallic container. The treated silicon wafer had a contact angle of the surface to water of 108°, whereas the untreated polished silicon wafer had a contact angle of 51°.

As in Example 2, an organic thin film was formed on the treated silicon wafer by spin coating, using the γAF 1600 solution, and a double faced tape-pasted metallic support frame was bonded to the organic thin film formed on the treated silicon wafer and peeled from the silicon wafer at 23° C. and a relative humidity of 50%, whereby the organic thin film could be easily peeled from the silicon wafer.

The resulting organic thin film was free from any wrinkles, color unevenness, traces of peeling and transferred matters from the substrate and was thus found satisfactory. The light transmittance at the wavelength of 248 nm was as high as 99.6% and the film thickness was uniform and satisfactory.

The silicon wafer surface that was peeled off the organic thin film had no traces of peeling and had a contact angle of the surface to water of 108°, and the silicon wafer was repeatedly used as a recycle silicon wafer.

Further organic thin films were repeatedly on the same recycle silicon wafer that was peeled off the organic thin film just before in the same manner as above, followed by peeling the just formed organic thin film, and it was found that 10 recyclic uses of the same recycle silicon wafer could be made.

The resulting organic thin films were all free from any wrinkles, color unevenness, traces of peeling and transferred matters from the substrate and were thus found satisfactory. The light transmittance at the wavelength of 248 nm was as high as or higher than 99.6%, and the film thickness was uniform and satisfactory.

Even after the 10 recyclic uses, the silicon wafer surface had no traces of peeling and had the same contact angle of the substrate to water of 108° as before the formation of the organic thin films.

Comparative Example 1

An organic thin film was formed on a polished silicon wafer having a contact angle of the surface to water of 51° by spin coating, using the CYTOP solution in the same manner as in Example 1. Then, a double faced tape-pasted metallic support frame was bonded to the organic thin film formed on the silicon wafer, followed by peeling from the silicon wafer at 23° C. and a relative humidity of 50%, but it was found that the peeling was so hard that the organic thin film was broken during the peeling and failed to peel.

Comparative Example 2

An organic thin film was formed on a polished silicon wafer having a contact angle of the surface to water of 51° by spin coating, using the γAF 1600 solution as in Example 2. Then, a double faced tape-pasted metallic support frame was bonded to the organic thin film formed on the silicon wafer, followed by peeling from the silicon wafer at 23° C. and a relative humidity of 50%, it was found that the peeling was so hard that the organic thin film was broken during the peeling. There were many remains of the organic thin film layer on the silicon wafer surface. Partially obtained organic thin film had many clouds and much color unevenness and the light transmittance at the wavelength of 248 nm was as low as 50 to 80%.

Comparative Example 3

As in Example 1, 10,10,10,9,9,8,8,7,7,6,6,5,5,4,4,3,3-heptadecafluoro-decyltrimethoxysilane and a polished silicon wafer were placed into a metallic vessel, followed by tight sealing. Then, the metallic vessel and its inside were heated to 105° C., left for standing in that state for 36 hours, and cooled to room temperature. The treated silicon wafer was taken out of the metallic vessel. It had a contact angle of the surface to water of 103°, whereas the untreated polished silicon wafer had a contact angle of 51°.

Then, nitrocellulose was dissolved into propyleneglycol monomethyl ether to make a 6.0 wt. % nitrocellulose solution.

The treated silicon wafer was set to a spin coater, and the nitrocellulose solution was filtered through a membrane filter having a pore size of 0.2 $\mu$m. The filtrate was subjected to spin coating, followed by drying on a hot plate, whereby an organic thin film having a thickness of 0.84 $\mu$m was formed. A double faced tape-pasted metallic support frame was bonded to the organic thin film formed on the silicon wafer, followed by peeling from the silicon wafer at 23° C. and a relative humidity of 50%, but it was found that the peeling was so hard that the organic thin film was broken during the peeling.

Example 6

An open top polyethylene container, 5 cm in diameter, containing 20 ml of 10,10,10,9,9,8,8,7,7,6,6,5,5,4,4,3,3-heptadecafluoro-decyltrimethoxysilane and a polished wafer were placed into a 30 cm-square metallic vessel, followed by tight sealing. The metallic vessel and its inside were heated to 105° C., left for standing for 36 hours, and cooled to room temperature. The treated silicon wafer was taken out of the metallic vessel. It had a contact angle of the surface to water of 110°, whereas the untreated polished silicon wafer had a contact angle of 51°.

Then, Teflon AF 2400 (trademark of a product commercially available from E.I. du Pont de Nemour & Co., Inc., USA) was irradiated with $\gamma$-rays in air at an irradiation dose of 300 kGy (Gy: dose unit), which will be hereinafter referred to as "$\gamma$AF 2400". The $\gamma$AF 2400 was dissolved into perfluorotributylamine to make a 1 wt. % solution. Cellulose acetate propionate CAP 482-20 (trademark of a product commercially available from Eastman-Kodak Co., USA), which will be hereinafter referred to as "CAP", was dissolved into propyleneglycol monomethyl ether. The resulting solution had a viscosity of 400 c poise (25° C.).

At first, the treated silicon wafer was set to a spin coater, and the $\gamma$AF 2400 solution was filtered through a membrane filter having a pore size of 0.2 $\mu$m. 5 cc of the filtrate was dropwise added to the silicon wafer, followed by revolution of the silicon wafer at 600 rpm for 30 seconds, air drying and further drying on a hot plate, whereby a reflection-preventing layer was formed on the silicon wafer. Then, the CAP solution was filtered through a membrane filter having a pore size of 0.2 $\mu$m, and 20 ml of the filtrate was dropwise added to the reflection-preventing layer, followed by revolution of the silicon wafer at 1,000 rpm for 45 seconds and evaporation of the solvent on a hot plate, whereby a 1.2 $\mu$m-thick thin film (central layer) composed of CAP was formed on the reflection-preventing layer on the silicon wafer.

Furthermore, 5 ml of the filtrate of the $\gamma$AF 2400 solution was dropwise added to the central layer, followed by revolution of the silicon wafer at 600 rpm for 30 seconds, air drying and further drying on a hot plate, whereby a further reflection-preventing layer was formed. That is, a triple layer film was obtained. The reflection-preventing layers formed on both sides of the central layer each had a thickness of 73 nm.

Then, a double faced tape-pasted metallic support frame was bonded to the triple layer film formed on the silicon wafer. The triple layer film could be easily peeled from the silicon wafer at 23° C. and a relative humidity of 50%.

The resulting triple layer pellicle film was free from color unevenness, traces of peeling and transferred matters from the substrate and was thus found satisfactory. The silicon wafer surface that was peeled off the pellicle film had no traces of peeling and had the same contact angle of the surface to water of 110° as before the formation of the pellicle film.

Then, a further triple layer pellicle film was formed again on the silicon wafer that was peeled off the pellicle film by spin coating in the same manner as above. A double faced tape-bonded metallic support frame was likewise bonded to the triple layer film formed on the silicon wafer. The triple layer film could be easily peeled from the silicon wafer at 23° C. and a relative humidity of 50%.

The resulting triple layer pellicle film was free from color unevenness, traces of peeling and transferred matters from the substrate and was thus found satisfactory. The silicon wafer surface had no traces of peeling and had a contact angle of the surface to water of 110°, and the silicon wafer was repeatedly used as a recycle silicon wafer.

Further triple layer pellicle films were repeatedly formed on the same recycle silicon wafer, followed by peeling from the silicon wafer. 30 cyclic uses of the same recycle silicon wafer could be made. The resulting triple layer pellicle films were all free from color unevenness, traces of peeling and transferred matters from the substrate and were thus found satisfactory. Even after the 30 cyclic uses, the recycle silicon wafer surface had no traces of peeling and had the same contact angle of the surface to water of 110° as before the formation of the pellicle films.

Example 7

As in Example 6, 10,10,10,9,9,8,8,7,7,6,6,5,5,4,4,3,3-heptadecafluoro-decyltrimethoxysilane and a polished silicon wafer were placed into a metallic vessel, followed by tight sealing. The metallic vessel and its inside were heated to 30° C., left for standing in that state for 24 hours, and cooled to room temperature. The treated silicon wafer was taken out of the metallic vessel. It had a contact angle of the surface to water of 103°, whereas the untreated polished silicon wafer had a contact angle of 51°.

As in Example 6, a reflection-preventing layer, a central layer and another reflection-preventing layer were successively formed in this order on the treated silicon wafer by spin coating to form a triple layer pellicle film. A double faced tape-pasted metallic support frame was bonded to the triple layer film formed on the silicon wafer, and the thus formed triple layer film could be easily peeled from the silicon wafer at 23° C. and a relative humidity of 50%. The resulting triple layer pellicle film was free from color unevenness, traces of peeling and transferred matters from the substrate and was thus found satisfactory. The silicon wafer surface that was peeled off the triple layer film had no traces of peeling and had a contact angle of the surface to water of 103°, and the silicon wafer was repeatedly used as a recycle silicon wafer.

Further triple layer pellicle films were repeatedly formed on the recycle silicon wafer, followed by peeling. Ten recyclic uses could be made. The resulting triple layer pellicle films were all free from color unevenness, traces of peeling and transferred matters from the substrate and were thus found satisfactory. Even after the 10 recyclic uses, the recycle silicon wafer surface had no traces of peeling and had the same contact angle of the surface to water of 103° as before the formation of the pellicle films.

Example 8

As in Example 7, 10,10,10,9,9,8,8,7,7,6,6,5,5,4,4,3,3-heptadecafluoro-decyltrimethoxysilane and a polished silicon wafer were placed into a metallic vessel, followed by tight sealing under vessel pressure of 660 mm Hg (−100 mm Hg). The metallic vessel and its inside were heated to 30° C., left for standing in that state for 24 hours, and cooled to room temperature. The treated silicon wafer was taken out of the metallic vessel. It had a contact angle of the surface to water of 104°, whereas the untreated polished silicon wafer had a contact angle of 51°.

As in Example 6, a reflection-preventing layer, a central layer and another reflection-preventing layer were successively formed in this order on the treated silicon wafer by spin coating to form a triple layer pellicle film. A double faced tape-pasted metallic support frame was bonded to the triple layer film formed on the silicon wafer, and the thus formed triple layer film could be easily peeled from the silicon wafer at 23° C. and a relative humidity of 50%. The resulting triple layer pellicle film was free from color unevenness, traces of peeling and transferred matters from the substrate and was thus found satisfactory. The silicon wafer surface that was peeled off the triple layer film had no traces of peeling and had a contact angle of the surface to water of 104°, and the silicon wafer was repeatedly used as a recycle silicon wafer.

Further triple layer pellicle films were repeatedly formed on the recycle silicon wafer, followed by peeling. Ten recyclic uses could be made. The resulting triple layer pellicle films were all free from color unevenness, traces of peeling and transferred matters from the substrate and were thus found satisfactory. Even after the 10 recyclic uses, the recycle silicon wafer had no traces of peeling and had the same contact angle of the surface to water of 104° as before the formation of the pellicle films.

Example 9

A compound represented by the following general formula (3):

$$CF_3(CF_2)_5CH_2CH_2Si(OMe)_3 \qquad (3)$$

where Me is a methyl group, and a polished silicon wafer were placed into a metallic vessel, followed by tight sealing. The metallic vessel and its inside were heated to 105° C., left for standing in that state for 36 hours, and cooled to room temperature. The treated silicon wafer was taken out of the metallic vessel. It had an contact angle of the surface to water of 108°, whereas the untreated polished silicon wafer had a contact angle of 51°.

As in Example 6, a reflection-preventing layer, a central layer and another reflection-preventing layer were successively formed in this order on the treated silicon wafer by spin coating to form a triple layer pellicle film, and a double faced tape-pasted metallic support frame was bonded to the triple layer film formed on the silicon wafer. The triple layer film could be easily peeled from the silicon wafer at 23° C. and a relative humidity of 50%. The resulting triple layer pellicle film was free from color unevenness, traces of peeling and transferred matters from the substrate and was thus found satisfactory. The silicon wafer surface that was peeled off the triple layer film had no traces of peeling and had an angle of the surface to water of 108° and the silicon wafer was repeatedly used as a recycle silicon wafer.

Further triple layer pellicle films were repeatedly formed on the same recycle silicon wafer, followed by peeling from the recycle silicon wafer. Ten recyclic uses could be made. The resulting triple layer pellicle films were all free from color unevenness, traces of peeling and transferred matters from the substrate and were thus found satisfactory. Even after the 10 recyclic uses, the silicon wafer surface had no traces of peeling and had the same contact angle of the surface to water of 108° as before the formation of the pellicle films.

Comparative Example 4

As in Example 6, a reflection-preventing layer, a central layer and another reflection-preventing layer were successively formed in this order on a polished silicon wafer by spin coating to form a triple layer pellicle film, and a double faced tape-pasted metallic support frame was bonded to the triple layer film formed on the silicon wafer, followed by peeling from the silicon wafer at 23° C. and a relative humidity of 50%. Peeling took place at the boundary between the reflection-preventing layer in contact with the silicon wafer and the central layer, and the pellicle film attached to the support film was in a double layer, while the reflection-preventing layer in contact with the silicon wafer remained on the silicon wafer.

What is claimed is:

1. A process for producing an organic thin film, which comprises forming an organic thin film comprising a fluorine-based material or a silicon-based material on the surface of a substrate having a layer comprising a silicon compound having a perfluoroalkyl group formed by vapor deposition on the surface, followed by peeling the film therefrom.

2. A process according to claim 1, wherein the organic thin film is in a single layer.

3. A process according to claim 1 or 2, wherein the organic thin film is a pellicle.

4. A process according to claim 3, wherein the pellicle comprises a reflection-preventing layer composed of a fluorine-based material and a transparent thin film layer.

5. A process for producing an organic thin film, which comprises forming an organic thin film comprising a fluorine-based material or a silicon-based material on the surface of a substrate having a layer comprising a compound represented by the following formula (1):

$$CF_3(CF_2)_nCH_2CH_2Si(OMe)_3 \qquad (1)$$

where n is an integer of 5 to 7 and Me is a methyl group.

6. A process according to claim 5, wherein the layer comprising a compound represented by formula (1) is formed by vapor deposition.

7. A process according to claim 5 or 6, wherein the organic thin film is in a single layer.

8. A process according to claim 5 or 6, wherein the organic thin film is a pellicle.

9. A process according to claim 7, wherein the pellicle comprises a reflection-preventing layer composed of a fluorine-based material and a transparent thin film layer.

* * * * *